United States Patent [19]
Sexton

[11] Patent Number: 5,046,073
[45] Date of Patent: Sep. 3, 1991

[54] SIGNAL PROCESSING APPARATUS FOR RECOVERING A CLOCK SIGNAL AND A DATA SIGNAL FROM AN ENCODED INFORMATION SIGNAL

[75] Inventor: Daniel W. Sexton, Charlottesville, Va.

[73] Assignee: GE Fanuc Automation North America, Inc., Charlottesville, Va.

[21] Appl. No.: 391,743

[22] Filed: Aug. 10, 1989

[51] Int. Cl.$^5$ .............................................. H04L 27/14
[52] U.S. Cl. ........................................ 375/82; 375/87; 375/88; 375/110; 328/56
[58] Field of Search ...................... 375/87, 88, 110, 82; 328/38.1, 56, 72, 155; 360/51, 43

[56] References Cited
U.S. PATENT DOCUMENTS

| | | | |
|---|---|---|---|
| 4,322,851 | 3/1982 | Vance | 375/88 |
| 4,462,107 | 7/1984 | Vance | 375/88 |
| 4,752,742 | 6/1988 | Akaiwa | 375/88 X |

OTHER PUBLICATIONS

"Single-Channel Phase-Coherent-FSK Bus Physical Layer"; May, 1988; Token-Passing Bus—IEEE 802.4 Draft K; pp. 173-186.

Primary Examiner—Douglas W. Olms
Assistant Examiner—Ralph Smith
Attorney, Agent, or Firm—James H. Beusse

[57] ABSTRACT

A signal processing apparatus is provided for recovering the clock signal and data signal from an encoded information signal. The encoded signal which is to be processed includes first symbols exhibiting a first frequency representing logical ones and second symbols exhibiting a second frequency representing logical zeros. A tapped delay line produces a first recovered clock signal exhibiting a frequency approximately twice that of the clock rate of the data signal. Circuitry is provided for recovering the data signal and a second recovered clock signal which exhibits a frequency approximately equal to the clock rate of the data signal.

8 Claims, 2 Drawing Sheets

SIGNAL PROCESSING APPARATUS FOR RECOVERING A CLOCK SIGNAL AND A DATA SIGNAL FROM AN ENCODED INFORMATION SIGNAL

BACKGROUND OF THE INVENTION

This invention relates in general to data decoding systems and, more particularly, to a method and apparatus for recovering a clock signal and a data signal from a received encoded information signal.

Information signals such as digital signals can be encoded on carrier signals in several different ways. For example, a digital signal including a sequence of ones and zeros may be encoded on a carrier signal by using phase shift keying, frequency shift keying (FSK) and other encoding techniques prior to transmission. A significant characteristic of the carrier signal in an FSK system is the time period allocated for each digital data bit. FIG. 1 shows an example of a digital signal 10 in which each bit of the digital signal exhibits a bit duration, bit length or bit time of time T1.

One way of encoding digital signal 10 on a carrier signal for transmission is to use the data coding scheme of the Institute Of Electrical And Electronic Engineers (IEEE) standard 802.4 five megabit carrier band network. When digital signal 10 is encoded using this technique, a resultant encoded signal 20 (also designated $V_E$) is generated as shown in FIG. 2. More specifically, the zeros (0's) of digital signal 10 are represented in encoded signal 20 by two full cycles of a 10 MHz signal designated HH (high frequency), while the ones (1's) of signal 10 are represented in encoded signal 20 by one full cycle of a 5 MHz signal designated LL (low frequency). IEEE standard 802.4 establishes a Medium Access Control (MAC) symbol time period which is equal to the time duration of one full cycle of a 5 MHz sinusoidal signal. Digital signals such as logical one's and zero's are defined by the frequency of the sinusoidal signal occuring during the defined time period.

Once the digital signals 10 are encoded on a carrier in a manner such as that described above, the encoded signals 20 are transmitted to a desired location via hardwire or radio transmission. Once the encoded signal 20 is received at the desired location, signal 20 must be decoded to restore the original digital information signal. One problem with decoding of such FSK signals of only one or two cycle duration is to synchronize a clock at the receiver with the received signal.

SUMMARY OF THE INVENTION

Among the objects of the present invention is the provision of a method and apparatus for recovering, i.e., synchronizing, the clock signals in a received FSK signal with a receiver clock to enable the extraction of digital data from the received signal.

The invention is disclosed in one form in a method and apparatus for extracting clock signals from a received FSK signal in which digital data signals have been encoded. The received FSK signal is first processed to convert it from a sinusoid to a set of digitally appearing signals comprised of logical H's and L's having a predetermined bit length and a predetermined clock rate wherein two consecutive H's represent a logic one and two consecutive L's represent a logic zero. The digitally appearing signals (H's and L's) are coupled to a signal processing apparatus which extracts from the sequence of signals a synchronous clock signal.

The signal processing apparatus includes a delay line having first, second, third and fourth taps spaced apart in time by approximately one eighth of the bit length. A first exclusive OR gate has first and second input terminals coupled to the first and second taps, respectively, of the delay line. A second exclusive OR gate has first and second input terminals coupled to the third and fourth taps, respectively, of the delay line. A first OR gate has first and second input terminals coupled, respectively, to the output terminals of the first and second exclusive OR gates. The first OR gate includes an output terminal at which a first recovered clock signal is generated which exhibits a frequency approximately equal to twice the clock rate of the received signal.

In one embodiment of the invention, the signal processing apparatus includes a first D type flip flop having a D input terminal to which the digitally appearing signals are provided and a clock input terminal which is coupled to the output terminal of the first OR gate to receive the first recovered clock signal therefrom. A third exclusive OR gate has first and second input terminals coupled to a Q output terminal and the D input terminal of the first D flip flop, respectively, and generates a decoded data signal at an output terminal thereof. A first NAND gate has a first input terminal coupled to the output terminal of the third exclusive OR gate for receiving such that the decoded data signal. A second NAND gate has a first input terminal coupled to an output terminal of the first NAND gate. A second D-type flip flop has a D input terminal coupled to an output terminal of the second NAND gate and a clock input terminal coupled to the output terminal of the first OR gate for receiving the first recovered clock signal. The second D-type flip flop includes a Q output terminal at which there is developed a recovered clock signal synchronous with the received signal. The recovered clock signal is coupled to both the first and second NAND gates by virtue of an electrical connection from the Q output terminal to second input terminals of each of the first and second NAND gates.

In another embodiment of the invention, the signal processing appartus includes a first D-type flip flop having a clock input terminal coupled to an output terminal of the first exclusive OR gate. The D input terminal and the Q output terminal of this flip flop are connected together so that the flip flop changes state on each clock signal. A second D-type flip flop has a D input terminal coupled to the $\overline{Q}$ output terminal of the first D-type flip flop and a clock input terminal coupled to the output terminal of the first OR gate for receiving the first recovered clock signal. A third exclusive OR gate has first and second input terminals coupled to the Q output terminal and the D input terminal of the second D-type flip flop, respectively, for generating a decoded data signal at an output thereof. In this embodiment, the apparatus also includes a NAND gate having first and second input terminals and an output terminal, the first input terminal of the NAND gate being coupled to the output of the second D-type flip flop. A third D-type flip flop has a D input terminal coupled to the output terminal of the NAND gate and a clock input terminal coupled to the output terminal of the first OR gate for receiving the first recovered clock signal. A $\overline{Q}$ output terminal of this third flip flop is coupled to the second input terminal of the NAND gate so that the Q output terminal produces a recovered clock signal exhibiting substantially the same frequency as the clock rate of the received signal and synchronous therewith.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 2A:
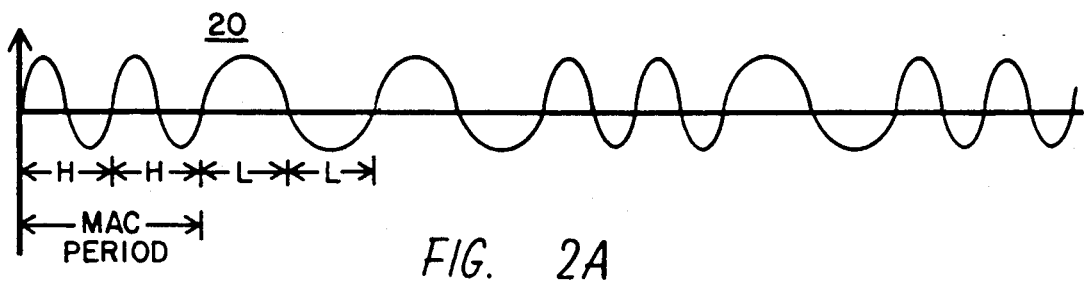
FIG. 2A is an analog representation of an FSK signal containing the digital data represented by the signal of FIG. 1.
Figure 2B:
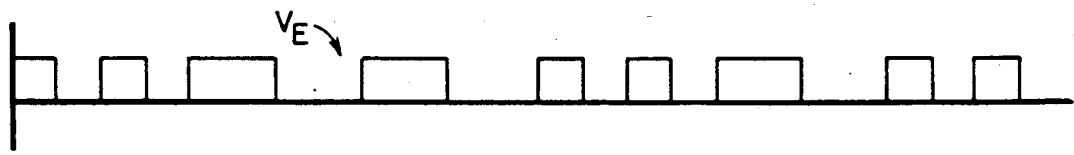
FIG. 2B is a digitally appearing representation of the signal of FIG. 2A useful in digital processing.
Figure 3:
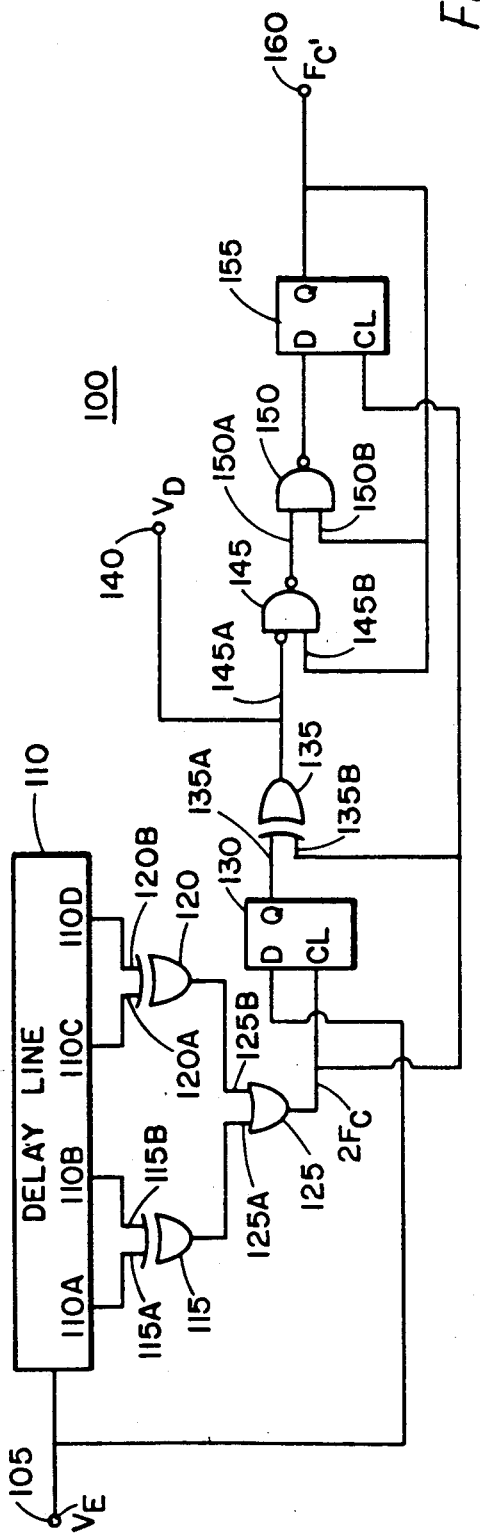
FIG. 3 is a schematic diagram of the signal processing apparatus of the present invention.

Referring first to FIG. 2B, there is shown a digitally appearing signal $V_E$ which is extracted from the received signal of FIG. 2A by detection of zero crossings and elimination of the negative portions of the received sinusoidal signal. Apparatus for such conversion is well known in the art and is not described herein. FIG. 3 is a schematic diagram of a signal processing apparatus 100 in accordance with the present invention. Signal processing apparatus 100 both recovers a clock signal $F_C$ (FIG. 6) from the received digitally appearing or digitally encoded signal $V_E$ provided to an input terminal 105 and the digital signal information which is contained in that encoded signal. More specifically, signal processing apparatus 100 includes an input terminal 105 to which an encoded signal $V_E$, such as signal 20 of FIG. 2B, is provided. $F_C$ represents a clock signal synchronous with the 5/10 MHz FSK carrier signal on which digital data was encoded for transmission. Signal processing apparatus 100 is alternatively referred to as clock and data signal recovery circuit 100.

Figure 1:
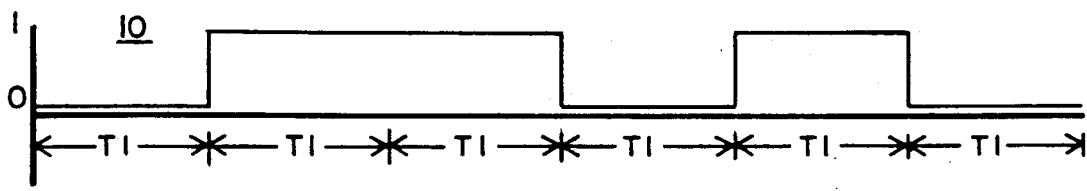
FIG. 1 is an amplitude vs. time representation of a digital information signal.

The characteristics of encoded signal 20 of FIG. 2A are set forth in the IEEE 802.4 five Megabit Carrier Band Network specifications. Basically, the encoded signal 20 is formed from H (high frequency) symbols and L (low frequency) symbols. By comparing FIG. 1 with FIG. 2A, it will be seen that a logical zero is represented by two full cycles of a 10 MHz signal while a logical one is represented by one full cycle of a 5 MHz signal. The time period allocated for each logical signal is the same and, by convention, is referenced to the 10 MHz time per cycle so that each logical signal is defined by a pair of the H or L symbols, i.e., the symbol {HH} corresponds to a logical zero and the symbol {LL} to a logical one. Non-data is indicated by the signal pairs {HL} {LH}. While the invention is applicable to other FSK protocols, it is described herein only in conjunction with the current IEEE standard.

The encoded signal $V_E$ at input 105 is supplied to the input of a delay line 110 as seen in FIG. 3. Delay line 110 includes four taps 110A, 110B, 110C and 110D. A time delay TD equal to approximately one quarter of the symbol length or approximately one quarter of the time duration of the H symbol (or L symbol) is provided by each of these taps. Thus, in this particular embodiment of the invention wherein the H symbol exhibits a frequency of 10 MHz, the corresponding bit length is 100 nsec. Accordingly, the time delay TD selected for each of taps 110A, 110B, 110C and 110D is 25 nsec. That is, tap 110A provides a time delay of 25 nsec, tap 110B provides a time delay of 50 nsec, tap 110C provides a time delay of 75 nsec and tap 110D provides a time delay of 100 nsec.

Tap 110A and tap 110B are coupled to inputs 115A and 115B of an exclusive OR gate 115. Tap 110C and tap 110D are coupled to inputs 120A and 120B of an exclusive OR gate 120. The outputs of exclusive OR gates 115 and 120 are coupled to inputs 125A and 125B of an OR gate 125.

Figure 4:
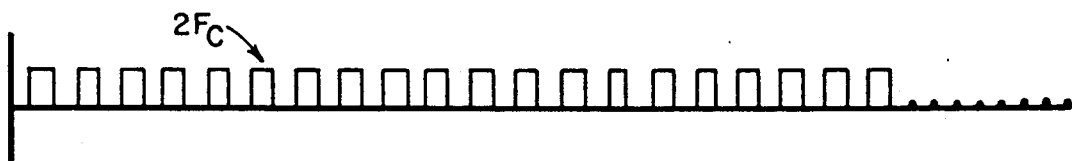
FIG. 4 is a an amplitude vs. time representation of a first recovered clock signal.

The signal generated at the output of OR gate 125 is the recovered clock signal $2F_C$ as seen in the amplitude vs. time representation shown in FIG. 4. The $2F_C$ representation of FIG. 4 is arranged immediately below the original data signal of FIG. 1 and the encoded signal of FIGS. 2A and 2B to facilitate ready comparison therewith. In this particular embodiment of the invention, the frequency of the recovered clock signal is 20 MHz or $2F_C$, that is, twice the frequency of the clock signal $F_C$ originally used to encode data on the encoded signal $V_E$.

By triggering the first exclusive OR, namely exclusive OR 115, with the signal $V_E$ delayed by 25 nsec, the resultant rising clock edges of the recovered clock signal $2F_C$ fall half way into the H symbols of incoming encoded signal $V_E$. Positioning the recovered clock signal in this manner with respect to the symbols of the encoded signal $V_E$ in this manner provides an advantageous signal to noise ratio.

The $2F_C$ output signal from OR gate 125 is coupled into a clock input terminal CL of a D-type flip flop 130. A data input D of flip flop 130 is coupled to the input terminal 105 such that the encoded signal $V_E$ is provided to the data input terminal D. Flip flop 130 samples the encoded signal $V_E$ provided to the D input terminal thereof at the 20 MHz recovered clock rate $2F_C$ provided to the CL clock input terminal of flip flop 130. That is, each time that the recovered clock signal at input terminal CL of exclusive OR gate 135 exhibits a positive transition, the present value of the encoded signal at the D input terminal is transferred to output terminal Q of flip flop 135. In this manner, the Q output signal of flip flop 135 is synchronized to the recovered 20 MHz clock.

Figure 5:
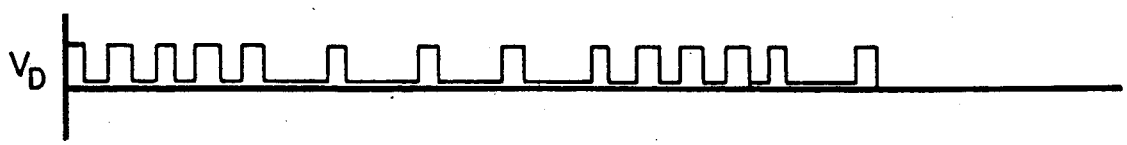
FIG. 5 is an amplitude vs. time representation of a decoded data signal.

The Q output signal of flip flop 130 is coupled to an input terminal 135A of a two input exclusive OR gate 135. The remaining input terminal 135B of exclusive OR gate 135 is coupled to input terminal 105. In this manner, the encoded signal $V_E$ is provided to exclusive OR gate input terminal 135B and the sampled encoded signal is provided to input terminal 135A. Exclusive OR gate 135 demodulates the encoded data signal $V_E$ and generates a decoded data signal $V_D$ illustrated in FIG. 5. The $V_D$ signal is coupled to a system output terminal 140 and to an inverting input terminal of a NAND gate 145. This decoded signal $V_D$, however, is synchronized to the 20 MHz recovered clock signal and not to the original 10 MHZ clock signal.

Figure 6:
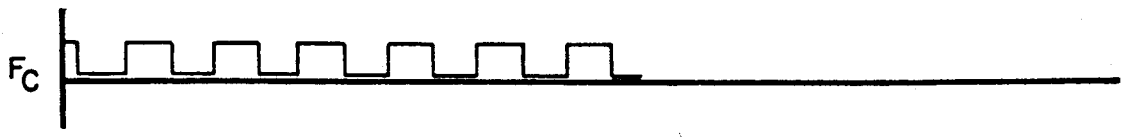
FIG. 6 is an amplitude vs. time representation of a second recovered clock signal.

The remaining circuitry of FIG. 3 develops a synchronized 10 MHz $F_C$ clock signal from the 20 MHz $2F_C$ clock signal. More specifically, the output signal $V_D$ of exclusive OR gate 135 is coupled to an inverting input terminal 145A of two input NAND gate 145. An output terminal of NAND gate 145 is coupled to one input terminal 150A of a dual input NAND gate 150. As will be appreciated, NAND gate 150 serves only as an inverter. An output terminal of NAND gate 150 is coupled to a data input D of a D-type flip flop 155. The Q output terminal of flip flop 155 is coupled to system output terminal 160 at which the signal $F_C$ is developed. The Q output terminal is also coupled to second input terminals 145 and 150B of respective ones of the NAND gates 145 and 150. The clock input CL of D-type flip flop 155 is coupled to the output of OR gate 125 such that the 20 MHz recovered clock signal $2F_C$ is supplied to clock flip flop 155 as a clock signal. The flip flop 155 thus generates a recovered clock signal $F_C$ at output terminal 160 which is synchronous with and which exhibits the same frequency as the 10 MHz clock signal which originally was used to generate the encoded signal $V_E$. A representation of the 10 MHz $F_C$ recovered clock signal is shown in FIG. 6.

A conventional decoder (not shown) is coupled to terminal 160 and terminal 140 to permit such decoder to fully decode the $V_D$ signal with respect to the $F_C$ recovered clock signal.

Figure 7:
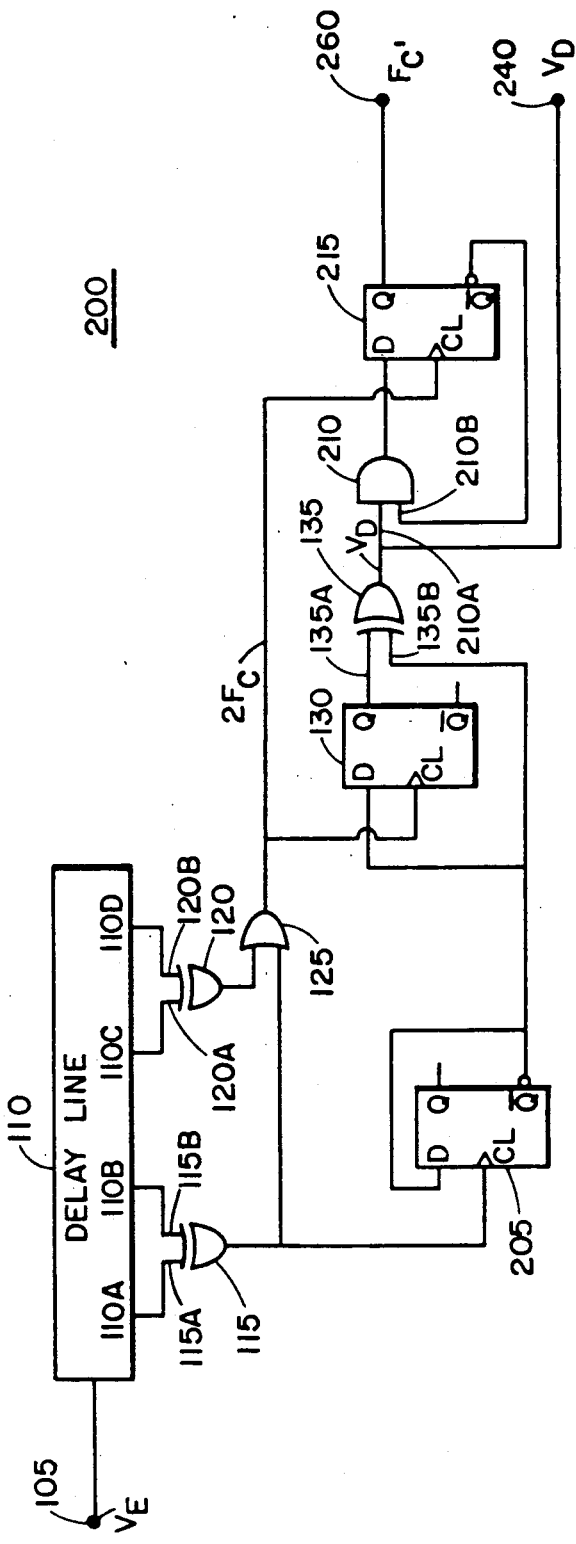
FIG. 7 is a schematic diagram of another embodiment of the signal processing apparatus of the present invention.

Another embodiment of the invention which is less sensitive to jitter than the above described embodiment is shown in FIG. 7 as clock and data signal recovery circuit 200 or signal processing apparatus 200. Signal processing apparatus 200 of FIG. 7 is similar to the above described signal processing apparatus 100 of FIG. 3 and like numbers are used to indicate like components in FIGS. 3 and 7. For example, in signal processing apparatus 200 of FIG. 7 delay line 110, exclusive OR gates 115 and 120, OR gate 125, flip flop 130 and exclusive OR gate 135 appear in substantially the same configuration as in signal processing apparatus 100 of FIG. 3. A recovered clock signal exhibiting a frequency of $2F_C$ is generated at the output terminal of OR gate 125.

Signal processing apparatus 200 includes a D-type flip flop 205 having a clock input terminal CL which is coupled to an output terminal of OR gate 115. D-type flip flop 205 has its D input terminal connected to its $\overline{Q}$ output terminal. The $\overline{Q}$ output terminal of flip flop 205 is coupled to a D input terminal of flip flop 130 and to input terminal 135B of an exclusive OR gate 135. The Q output terminal of flip flop 130 is coupled to input terminal 135A of exclusive OR gate 135. As in the earlier described embodiment of FIG. 3, exclusive OR gate 135 acts as a demodulator to produce a decoded signal $V_D$ which is synchronized to the 20 MHz recovered clock signal designated $2F_C$.

The output terminal of exclusive OR gate 135 is coupled to an input terminal 210A of a two input AND gate 210, the remaining input terminal 210B of which is coupled to a $\overline{Q}$ output terminal of a D-type flip flop 215. The output terminal of OR gate 125 is coupled to the clock input terminal CL of D-type flip flop 215 to provide the $2F_C$ recovered clock signal thereto. The output terminal of AND gate 210 is coupled to the D input terminal of D-type flip flop 215. The output terminal of exclusive OR gate 135 is coupled to a terminal 240 at which the recovered data signal $V_D$ is produced. The Q output terminal of D-type flip flop 215 is coupled to a terminal 260 which is designated $F_C$. The Q output terminal of flip flop 215 produces a recovered clock signal $F_C$ at output terminal 260 which is synchronous with and which exhibits the same frequency as the 10 MHz clock signal which originally was used to generate the data signal encoded on the encoded signal $V_E$. It will be recalled that a representation of the 10 MHz $F_C'$ recovered clock signal is shown in FIG. 6.

A conventional decoder (not shown) is coupled to terminal 260 and terminal 240 to permit such decoder to fully decode the $V_D$ signal with respect to the $F_C'$ recovered clock signal.

The foregoing describes a signal processing apparatus for recovering the clock signal and data from an encoded information signal. The clock and data recovery apparatus 200 of FIG. 7 samples the edges of the incoming data signal $V_D$ and provides more propagation delay than observed in apparatus 100, thus significantly improving performance. The logic gates and flip flops in apparatus 100 and 200 are conveniently implemented in a programmable hardware logic array. In this manner path delays within the apparatus are substantially matched.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A signal processing apparatus for recovering information from an encoded information signal, said information signal being encoded with a digital data signal including logical 1's and 0's having a predetermined bit length and a predetermined clock rate, first frequency symbols being employed to represent logical 1's and second frequency symbols being employed to represent logical 0's in said encoded information signal, each of said first and second symbols exhibiting a predetermined time duration substantially equal to said bit length, said apparatus comprising:

a delay line, responsive to said encoded information signal, including first, second, third and fourth taps spaced apart in time by approximately one quarter of said symbol length;

a first exclusive OR gate including first and second input terminals coupled to said first and second taps, respectively, and further including an output terminal;

a second exclusive OR gate including first and second input terminals coupled to said third and fourth taps, respectively, and further including an output terminal; and a first OR gate including first and second input terminals coupled respectively to the output terminals of said first and second exclusive OR gates, said first OR gate including an output terminal at which a first recovered clock signal is generated which exhibits a frequency approximately equal to twice the predetermined clock rate.

2. The apparatus of claim 1 further including:

a first D-type flip flop having a D input terminal to which said encoded information signal is provided, said first D-type flip flop further including a clock input terminal coupled to the output terminal of said first OR gate for receiving said first recovered clock signal thereto, said first D flip flop including a Q output terminal; and a third exclusive OR gate having first and second input terminals coupled to the Q output terminal and the D input terminal of said first D-type flip flop, respectively, a decoded data signal being generated at the output terminal of said third exclusive OR gate.

3. The apparatus of claim 2 further including:

a first NAND gate having first and second input terminals and an output terminal, the first input terminal of said first NAND gate being coupled to the output terminal of said third exclusive OR gate for receiving said decoded data signal;

a second NAND gate having first and second input terminals and an output terminal, the first input terminal of said second NAND gate being coupled to the output terminal of said first NAND gate and the second input terminal of said second NAND gate being coupled to the second input terminal of said first NAND gate; and a second D-type flip flop having a D input terminal coupled to the output terminal of said second NAND gate, and further having a clock input terminal coupled to the output terminal of said first OR gate for receiving said first recovered clock signal, said second D-type flip flop including a Q output terminal coupled to the second input terminal of said second NAND gate and at which a second recovered clock signal is produced exhibiting substantially the same frequency as said predetermined clock rate.

4. The apparatus of claim 1 further including:

a first D-type flip flop having a clock input terminal coupled to the output terminal of said first exclusive OR gate, said first D-type flip flop further including a D input terminal and a $\overline{Q}$ output terminal coupled together;

a second D-type flip flop having a D input terminal coupled to the $\overline{Q}$ output terminal of said first D-type flip flop, said second D-type flip flop further including a clock input terminal coupled to the output terminal of said first OR gate for receiving said first recovered clock signal, said second D-type flip flop including a Q output terminal; and a third exclusive OR gate having first and second input terminals coupled, respectively, to the Q output terminal and the D input terminal of said second D-type flip flop, a decoded data signal being generated at the output of said third exclusive OR gate.

5. The apparatus of claim 4 further including:

a NAND gate having first and second input terminals and an output terminal, the first input terminal of said NAND gate being coupled to the output terminal of said second D-type flip flop; and a third D-type flip flop having a D input terminal coupled to the output terminal of said NAND gate, said third D-type flip flop further including a clock input terminal coupled to the output of said first OR gate for receiving said first recovered clock signal, said third flip flop including a $\overline{Q}$ output terminal coupled to the second input terminal of said NAND gate, and a Q output terminal at which a second recovered clock signal is produced exhibiting substantially the same frequency as said clock rate.

6. A method for recovering data and a data synchronized clock signal from an FSK signal in which data has been encoded in preselected time increments, said method including the steps of:

converting a received FSK signal into a sequence of digitally appearing signals in which a first frequency is represented by at least two first signals having a first preselected pulse width and a second frequency is represented by at least one second signal having a second preselected pulse width;

time delaying each of the first and second signals by each of a plurality of successively increasing time delays;

logically combining each of the first and second time delayed signals generated by said step of time delaying to generate clock pulses at twice the frequency of the clock signal; and clocking the first and second signals with the generated clock pulses for producing a converted data signal synchronized to the clock pulses.

7. The method of claim 6 and further including the step of:

logically combining the converted data signal with the clock pulses to produce a set of clock signals synchronized with the converted data and having a repetition rate corresponding to the data synchronized clock signal used to encode data in the FSK signal.

8. The method of claim 7 wherein the step of logically combining the first and second time delayed signals includes the steps of:

exclusive OR'ing the delayed signals in preselected pairs thereof and logically summing the results of the step of exclusive OR'ing to generate the clock pulses at twice the frequency of the clock signal;

synchronizing the clock pulses with the converted data signal by gating the data signal through a logical gating apparatus with the clock pulses;

exclusive OR'ing the gated data signal obtained from the step of synchronizing with the converted data signal to produce a clock pulse synchronized converted data signal.

* * * * *